US011413747B2

(12) United States Patent
Luis y Prado

(10) Patent No.: US 11,413,747 B2
(45) Date of Patent: Aug. 16, 2022

(54) MACHINE LEARNING DRIVEN COMPUTER NUMERICAL CONTROL OF A ROBOTIC MACHINE TOOL

(71) Applicant: Workshops for Warriors, San Diego, CA (US)

(72) Inventor: Hernán Luis y Prado, San Diego, CA (US)

(73) Assignee: Workshops for Warriors, San Diego, CA (US)

( * ) Notice: Subject to any disclaimer, the term of this patent is extended or adjusted under 35 U.S.C. 154(b) by 0 days.

(21) Appl. No.: 16/538,614

(22) Filed: Aug. 12, 2019

(65) Prior Publication Data

US 2021/0046642 A1  Feb. 18, 2021

(51) Int. Cl.
*B25J 9/16* (2006.01)
*B25J 11/00* (2006.01)
(Continued)

(52) U.S. Cl.
CPC ........... *B25J 9/163* (2013.01); *B25J 11/0055* (2013.01); *B25J 13/088* (2013.01);
(Continued)

(58) Field of Classification Search
CPC ................ G06N 20/00; G05B 13/0265; G05B 19/4163; G05B 2219/49065; G05B 19/401; G05B 19/4083; G05B 2219/33034; G05B 2219/49307; G05B 19/404; G05B 19/406; G05B 19/4063; G05B 19/4097;
(Continued)

(56) References Cited

U.S. PATENT DOCUMENTS 5,752,790 A * 5/1998 Szczepanski .......... G01N 27/72
  409/2
6,890,134 B1 * 5/2005 Wagner .................... B23C 3/32
  409/131
(Continued)

OTHER PUBLICATIONS

Xiao et all., "An approach for blank dimension design considering energy consumption," Int J Adv Manuf Technol (2016) 87:1229-1235 (Year: 2016).*
(Continued)

*Primary Examiner* — Darrin D Dunn
(74) *Attorney, Agent, or Firm* — Fish & Richardson P.C.

(57) ABSTRACT

A modular robotic apparatus includes one or more sensors configured to generate sensor signals representing a manufacturing environment in which the modular robotic apparatus is located. A machine learning module is communicably coupled to the one or more sensors and includes a computer processor. The computer processor generates, by a machine learning model trained based on one or more manufacturing parameters, a computer numerical control (CNC) configuration. The one or more manufacturing parameters define a manufacturing task to be performed by the modular robotic apparatus. The machine learning model adjusts the CNC configuration based on the sensor signals. A robotic machine tool is communicably coupled to the machine learning module and includes an end effector. The robotic machine tool is configured to operate the end effector in accordance with the adjusted CNC configuration.

32 Claims, 4 Drawing Sheets

(51) Int. Cl.
  *G05B 13/02* (2006.01)
  *B25J 13/08* (2006.01)
  *B25J 19/00* (2006.01)
(52) U.S. Cl.
  CPC ...... *B25J 19/0054* (2013.01); *G05B 13/0265* (2013.01); *G05B 2219/39466* (2013.01); *G05B 2219/49065* (2013.01); *G05B 2219/50391* (2013.01)
(58) Field of Classification Search
  CPC .......... G05B 19/4183; G05B 19/41875; G05B 2219/49061; G05B 13/028; G05B 2219/33056; G05B 2219/33321; G05B 13/00; G05B 19/18; G05B 2219/39466; G05B 2219/50391; G05B 2219/40499; B25J 9/163; B25J 11/0055; B25J 13/088; B25J 19/0054
  See application file for complete search history.

(56) References Cited

U.S. PATENT DOCUMENTS

| | | | | |
|---|---|---|---|---|
| 8,428,777 | B1* | 4/2013 | Poursohi | G05B 19/41865 700/248 |
| 2007/0271002 | A1* | 11/2007 | Hoskinson | G05D 1/0088 700/245 |
| 2009/0234499 | A1* | 9/2009 | Nielsen | B25J 9/1666 700/250 |
| 2014/0129503 | A1* | 5/2014 | Yang | G06N 5/04 706/46 |
| 2017/0021502 | A1* | 1/2017 | Nusser | B25J 9/1697 |
| 2017/0047149 | A1* | 2/2017 | Dempsey | H03M 1/765 |
| 2017/0206469 | A1* | 7/2017 | Das | G05B 23/0254 |
| 2017/0243135 | A1* | 8/2017 | Ooba | G05B 13/0265 |
| 2017/0343992 | A1* | 11/2017 | Benaim | G06K 9/00355 |
| 2018/0001476 | A1* | 1/2018 | Tan | B61G 7/04 |
| 2018/0189748 | A1* | 7/2018 | Anderson | G06Q 10/20 |
| 2018/0299865 | A1* | 10/2018 | Holmstrom | G05B 19/4065 |
| 2019/0025794 | A1* | 1/2019 | Matsumura | G05B 19/404 |
| 2019/0041808 | A1* | 2/2019 | Hada | G05B 13/027 |
| 2019/0047149 | A1 | 2/2019 | Wouhaybi | |
| 2019/0351512 | A1* | 11/2019 | Izumi | G05B 13/021 |
| 2020/0282549 | A1* | 9/2020 | Torii | B25J 9/1682 |
| 2020/0290169 | A1* | 9/2020 | Ozeki | B25J 9/1633 |
| 2020/0331709 | A1* | 10/2020 | Huang | B25J 9/163 |

OTHER PUBLICATIONS

Chatelain et al., "A balancing technique for optimal blank part machining," Journal of the International Societies for Precision Engineering and Nanotechnology25 (2001) (Year: 2001).*

* cited by examiner

400

```
┌─────────────────────────────────────────────────────────────┐
│ Generate, by one or more sensors, sensor signals representing a manufacturing │
│ environment in which a modular robotic apparatus is located, the modular robotic │
│ apparatus comprising a robotic machine tool and a machine learning module, the │
│ machine learning module comprising a machine learning model │
│ 404 │
└─────────────────────────────────────────────────────────────┘
```

```
┌─────────────────────────────────────────────────────────────┐
│ Generate, by the machine learning model, a computer numerical control (CNC) │
│ configuration, the machine learning model trained based on one or more │
│ manufacturing parameters defining a manufacturing task to be performed by the │
│ modular robotic apparatus │
│ 408 │
└─────────────────────────────────────────────────────────────┘
```

```
┌─────────────────────────────────────────────────────────────┐
│ Adjust, by the machine learning model, the CNC configuration, based on the │
│ sensor signals │
│ 412 │
└─────────────────────────────────────────────────────────────┘
```

```
┌─────────────────────────────────────────────────────────────┐
│ Operate, by the robotic machine tool, an end effector of the robotic machine tool in │
│ accordance with the adjusted CNC configuration to perform the manufacturing task │
│ 416 │
└─────────────────────────────────────────────────────────────┘
```

FIG. 4

MACHINE LEARNING DRIVEN COMPUTER NUMERICAL CONTROL OF A ROBOTIC MACHINE TOOL

TECHNICAL FIELD

This description relates generally to operation of robots and specifically to machine learning driven computer numerical control of a robotic machine tool.

BACKGROUND

Manufacturing of materials from manufacturing stock to a final part or assembly often requires a worker or a factory's decision-making system to select between different manufacturing objectives. However, a complex manufacturing process can require many decisions, making traditional manufacturing methods impractical. Moreover, manufacturing jobs and processes can remain idle or unfilled because of a lack of skilled labor.

SUMMARY

A modular robotic apparatus is provided for machine learning driven computer numerical control of a robotic machine tool. The modular robotic apparatus includes one or more sensors configured to generate sensor signals representing a manufacturing environment in which the modular robotic apparatus is located. A machine learning module is communicably coupled to the one or more sensors. The machine learning module includes one or more computer processors. The computer processors generate, by a machine learning model trained based on one or more manufacturing parameters, a computer numerical control (CNC) configuration. The one or more manufacturing parameters define a manufacturing task to be performed by the modular robotic apparatus. The machine learning model adjusts the CNC configuration based on the sensor signals. A robotic machine tool is communicably coupled to the machine learning module and includes an end effector. The robotic machine tool is configured to operate the end effector in accordance with the adjusted CNC configuration.

Among others, the technical benefits and advantages provided by the embodiments disclosed herein include performing manufacturing tasks with improved accuracy by CNC processes with and without feedback mechanisms that enable increased efficiencies in processing time and hardware resources. The dependence on human labor is reduced. A machine learning model is trained to receive feedback from sensors of the modular robotic apparatus and generate instructions to the robotic machine tool to refine or adjust the manufacturing process for greater accuracy. Moreover, the embodiments disclosed herein enable the transfer of manufacturing parametric knowledge onto the machine learning platform to provide continuous improvements in efficiency. The embodiments enable the incorporation of artificial intelligence in the manufacturing process to expedite manufacturing processes, make manufacturing cycles more efficient, better utilize the available manufacturing resources, and increase the robotic machine tool life. Furthermore, a more-experienced operator can monitor the system's generation of specifications, solid models, setups, material choices, or tool paths while a less-experienced operator can monitor the implementation of the job.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 4 illustrates an example process for machine learning driven computer numerical control of a robotic machine tool, in accordance with one or more embodiments.

DETAILED DESCRIPTION

Figure 1:
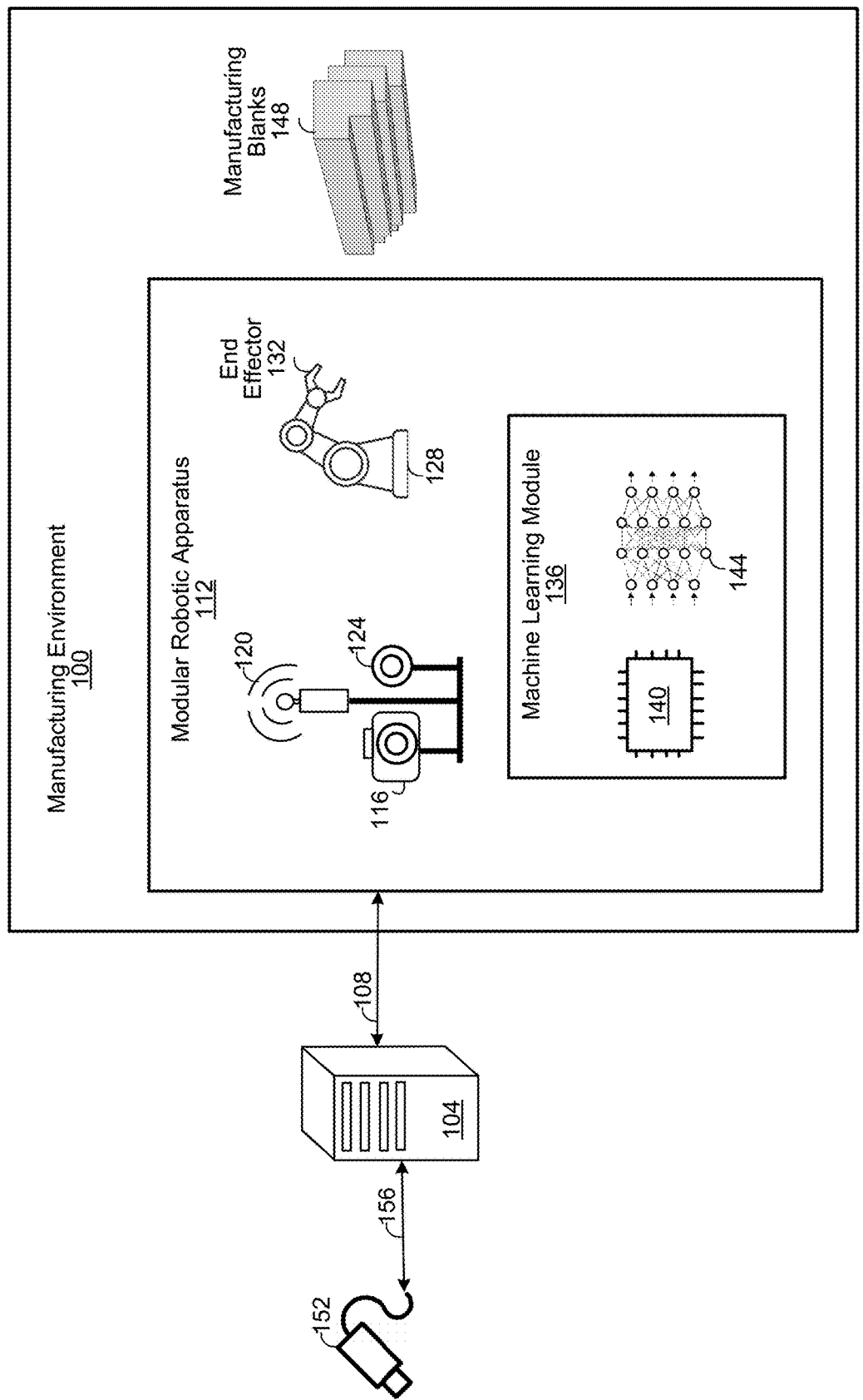
FIG. 1 illustrates an example manufacturing environment for machine learning driven computer numerical control of a robotic machine tool, in accordance with one or more embodiments.

In the following description, for the purposes of explanation, numerous specific details are set forth in order to provide a thorough understanding of the present embodiments. It will be apparent, however, that the present embodiments may be practiced without these specific details.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details.

Several features are described hereafter that can each be used independently of one another or with any combination of other features. Although headings are provided, information related to a particular heading, but not found in the section having that heading, may also be found elsewhere in this description.

General Overview

The embodiments disclosed herein describe a computer-implemented modular manufacturing hardware-software ecosystem, which allows for different levels of automation to facilitate, expedite, and replicate different manufacturing processes. The manufacturing processes can include (i) the manufacturing of parts, weapons, or consumables, (ii) the performing of quality assurance inspections for parts, vehicles, or sewers, and (iii) the setting up of remote systems such as solar, energy systems, drilling, assembly of parts or subassemblies, repair of parts, or reverse engineering of parts.

In particular, a modular robotic apparatus is disclosed including one or more sensors configured to generate sensor signals representing a manufacturing environment in which the modular robotic apparatus is located. A machine learning module is communicably coupled to the one or more sensors and includes a computer processor. The computer processor generates, by a machine learning model trained based on one or more manufacturing parameters, a computer numerical control (CNC) configuration. The one or more manufacturing parameters define a manufacturing task to be performed by the modular robotic apparatus. The machine learning module adjusts the CNC configuration based on the sensor signals. A robotic machine tool is communicably coupled to the machine learning module and includes an end effector. The robotic machine tool is configured to operate the end effector in accordance with the adjusted CNC configuration.

Example Manufacturing Environment

FIG. 1 illustrates an example manufacturing environment 100 for machine learning driven computer numerical control of a robotic machine tool 128, in accordance with one or more embodiments. FIG. 1 depicts an imaging device 152, solid model data 156, a computer server 104 and the manufacturing environment 100. The computer server 104 is communicably coupled to a modular robotic apparatus 112 in the manufacturing environment 100 to transmit data 108 to the modular robotic apparatus 112.

The imaging device 152 captures one or more images of a three-dimensional solid part or assembly to be manufactured. For example, the imaging device 152 can include a digital camera, a scanner, an image sensor, a CCD camera, etc. The imaging device 152 further performs computer modeling of the three-dimensional solid for computer-aided design. For example, the imaging device 152 can use or generate a reference shell geometry or a composite definition to construct a solid model 156 of the three-dimensional solid. The imaging device 152 can describe how the solid model 156 is divided into elements in the thickness direction and how drop- and cut-off elements are handled. A level of detail in the solid model 156 generated depends on a level of accuracy of the different features to be modeled. The solid model 156 is stored on the computer server 104. Information associated with the solid model 156 can include a type of tool used to manufacture the three-dimensional solid part. This information can thus be used to reverse engineer the three-dimensional solid part. In some embodiments, the imaging device 152 is part of the manufacturing environment 100.

In some embodiments, the data 108 includes the solid model 156 and machine learning models (e.g., 144) trained to control operation of the modular robotic apparatus 112 to perform different manufacturing tasks (e.g., cutting, shearing, sawing, turning, or water jetting). A trained machine learning model 144 can be transmitted to the modular robotic apparatus 112 and plugged into (stored in) a memory unit or data storage of the machine learning module 136 for operating the modular robotic apparatus 112. In other embodiments, the data 108 includes an untrained machine learning model 144 and training data to train the untrained machine learning model 144 to perform a manufacturing task. In some embodiments, the computer server 104 stores and transmits manufacturing parameters (e.g., a dimension, a weight, a cut length, or tolerance levels) for performing a manufacturing task. The manufacturing parameters can be generated from the solid model 156.

In some embodiments, the computer server 104 is part of a cloud computing environment. The cloud computing environment can include one or more cloud data centers. In general, a cloud data center refers to the physical arrangement of computer servers 104 that make up a cloud or a particular portion of a cloud. For example, the computer servers 104 are physically arranged in a cloud datacenter into rooms, groups, rows, and racks. A cloud datacenter can have one or more zones, which include one or more rooms of computer servers 104. Each room has one or more rows of computer servers 104, and each row includes one or more racks. Each rack includes one or more individual computer server nodes. In some embodiments, computer servers 104 in zones, rooms, racks, and/or rows are arranged into groups based on physical infrastructure requirements of the datacenter facility, which include power, energy, thermal, heat, and/or other requirements. In some embodiments, the server nodes are similar to the computer system described in more detail below with reference to FIG. 3.

The data 108 is transferred over a network and networking resources (for example, networking equipment, nodes, routers, switches, and networking cables) that interconnect the computer server 104 to the modular robotic apparatus 112 and help facilitate the manufacturing environment 100's access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), or Frame Relay. Furthermore, in embodiments where the network represents a combination of multiple sub-networks, different network layer protocols are used at each of the underlying sub-networks. In some embodiments, the network represents one or more interconnected internetworks, such as the public Internet.

The manufacturing environment 100 includes the modular robotic apparatus 112 and the manufacturing blanks 148. The manufacturing environment 100 can be an example of a shop floor, a factory, a robotic workplace, a semiconductor fabrication facility, a cleanroom, or a laboratory. In other embodiments, the manufacturing environment 100 includes additional objects or components than those described herein.

The manufacturing blanks 148 are pieces of metal, wood, ceramic, composite, or plastic from which a part or a container is manufactured or machined by the modular robotic apparatus 112. For example, the modular robotic apparatus 112 can include a drill, a boring tool, a lathe, or a three-dimensional (3D) printer to alter the manufacturing blanks 148 to meet the specifications defined by manufacturing parameters. The manufacturing blanks 148 are formed from manufacturing stock. The manufacturing stock is a first level of material accessed before machining or other manufacturing tasks are performed. For example, a manufacturing stock can be a 20 foot long section of 2" by 2" bar stock. This manufacturing stock has not been machined in any way, and is accessed straight off a truck or foundry. A manufacturing blank 148, on the other hand, is material that has particular dimensions and characteristics for a manufacturing process. The process can be additive (e.g., 3D printing or welding), subtractive (e.g., milling, turning, water jetting, or plasma cutting), or a hybrid of additive and subtractive processes.

A remnant refers to material that is left over when a manufacturing blank 148 is removed from manufacturing stock or material that is left after a manufacturing blank 148 has been manufactured to create a manufactured part. The remnant can be identified by the modular robotic apparatus 112, such that it can become a part later on in the process. A manufactured part can be joined with other parts to create a manufactured sub-assembly. Manufactured subassemblies can then be joined to create a manufactured assembly. Manufactured assemblies can be joined or connected to create a manufactured system such as a liquid crystal display (LCD) television or an automobile.

The modular robotic apparatus 112 performs machine learning driven computer numerical control of the robotic machine tool 128. In some embodiments, the modular robotic apparatus 112 is part of a cloud computing environment or a local computing environment (e.g., a local network not attached to the outside world) as described above. Cloud computing is a model of service delivery for enabling convenient, on-demand network access to a shared pool of configurable computing resources (e.g. networks, network bandwidth, computer servers 104, computer processors 140, memory, storage, applications, virtual machines, and services). In typical cloud computing systems, one or more large cloud data centers house the machines (e.g., the computer server 104) used to deliver the services provided by the cloud.

In some embodiments, the modular robotic apparatus 112 is enabled with autonomous capability that enables the modular robotic apparatus 112 to be partially or fully operated without real-time human intervention. For example, the modular robotic apparatus 112 can use its sensor 116 and the machine learning module 136 to determine a path or route to navigate from a first spatiotemporal location within the manufacturing environment 100 to a second spatiotemporal location, for example, to pick up a manufacturing blank 148. The modular robotic apparatus 112 includes one or more sensors 116, 124, the robotic machine tool 128, and a machine learning module 136. In other embodiments, the modular robotic apparatus 112 includes additional components than those described herein.

The one or more sensors 116, 124 include hardware components that detect information about the manufacturing environment 100 surrounding the sensors 116, 124. The sensors 116, 124 can include sensing components (e.g., image sensors, weight sensors, force sensors, composition sensors, density sensors, hardness sensors, color sensors, x-ray sensors, mass-spectrometers, or biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller. In some embodiments, the sensors 116, 124 are used for self-localization by the modular robotic apparatus 112 with respect to the manufacturing environment 100. The self-localization can be used to couple or uncouple the end effector 132 to different tools or manufacturing blanks.

In some embodiments, the sensor 124 measures or infers properties of a state or condition of the manufacturing environment 100, such as a state of matter (e.g., gaseous, solid, liquid, or plasma), a pressure, a vacuum, or a percentage of oxygen (or other gases) in the air. In some embodiments, the sensor 124 determines a position, linear velocity and acceleration, or an angular velocity and acceleration of the robotic machine tool 128. For example, the sensor 124 can include a global positioning system (GPS) unit or an inertial measurement unit (IMU) that measures linear acceleration and angular rate. The sensor 116 includes monocular or stereo video cameras in the visible light, infrared or thermal (or both) spectra, LiDAR, RADAR, ultrasonic sensors, time-of-flight (TOF) depth sensors, speed sensors, temperature sensors, humidity sensors, or precipitation sensors. LiDAR is a technology that uses light (e.g., bursts of light such as infrared light) to obtain data about physical objects in its line of sight. A LiDAR sensor produces sensor signals 120 (collections of 3D or 2D points clouds) that are used to construct a representation of the manufacturing environment 100. The RADAR sensors use radio waves to obtain data about nearby physical objects and produce sensor signals 120 such as radio frequency electromagnetic signals used to construct a representation of the manufacturing environment 100. Similarly, an X-ray machine, CAT scan, magnetic resonance machine, or other technology that can determine a physical property can be used to construct a representation of the manufacturing environment 100.

The sensors 116, 124 are configured to generate sensor signals 120 representing the manufacturing environment 100 in which the modular robotic apparatus 112 is located. For example, the sensor signals 120 can include voltages, electric currents, or digital signals. In some embodiments, the sensor 124 includes a coordinate measuring machine (CMM). A CMM measures the geometry of a manufacturing blank 148 by sensing discrete points on the surface of the manufacturing blank 148, e.g., using mechanical, optical, or laser means. The sensor signals 120 can represent a dimension of the manufacturing blank 148, e.g., a height, width, length, or curvature. For example, the sensor signals 120 can represent a weight of the manufacturing blank 148, such that the machine learning module 136 can determine whether the manufacturing blank 148 meets the manufacturing parameters or whether the manufacturing blank 148 should be classified as a reject.

The sensor signals 120 can represent a density of the manufacturing blank 148, such that the machine learning module 136 can determine whether the robotic machine tool 128 is correctly matched to the manufacturing blank 148. A less dense manufacturing blank 148 can necessitate a different tool. For example, the machine learning model 144 can be trained to determine, based on the sensor signals 120, an optimal tool for a manufacturing task, an alternate robotic machine tool 128 for the manufacturing task, an optimal manufacturing stock or manufacturing blank 148 for the manufacturing task, or the optimal equipment for transforming the manufacturing stock into the manufacturing blank 148.

The sensor signals 120 can represent a hardness of the manufacturing blank 148. For example, the firmness, solidity, stiffness, or rigidity of the manufacturing blank 148 can be measured, such that the machine learning module 136 can determine whether the manufacturing blank 148 meets the manufacturing parameters or whether the manufacturing blank 148 should be classified as a reject. The sensor signals 120 can represent an amount of tool wear. For example, an erosion of the end effector 132 in contact with the manufacturing blank 146 can be measured, such that the machine learning module 136 can determine whether the end effector 132 or the robotic machine tool 128 should be replaced.

The sensor signals 120 can represent a surface finish of the manufacturing blank 148 on which a computer numerical control (CNC) configuration defines the manufacturing task to be performed. The CNC configuration is a coded program set of instructions that controls the robotic machine tool 128 movement. For example, the CNC configuration automates drills, boring tools, lathes, or 3D printers to alter the manufacturing blank 148 to meet specifications defined by manufacturing parameters. The surface finish of the manufacturing blank 148 can be measured, such that the machine learning module 136 can determine whether to halt the manufacturing task. In some embodiments, after the manufacturing task is halted, the robotic machine tool 128 is driven by the machine learning module 136 to determine whether to mark or identify a remnant. If the remnant is to be used immediately, the robotic machine tool 128 moves on to the next manufacturing task. The machine learning module 136 thus adjusts the CNC configuration based on the sensor signals 120. In some embodiments, the adjusted CNC configuration instructs the robotic machine tool to move a remnant to the next manufacturing location within the manufacturing environment 100. In some embodiments, the modular robotic apparatus 112 updates a machine hour counter for a tool, a saw, a blade, or coolant.

In some embodiments, a sensor is coupled to a motor that displays an amount of electrical current used for the cutting application or a force used to perform a certain motion. An increase or decrease in the current or force indicates a worn, missing, or broken tool. An input is provided to the system to halt operation, reduce force, adjust cutting parameters, or adjust cutter or tool compensation to ensure desired results.

In some embodiments, the sensor signals 120 represent an increase in a temperature of the manufacturing environment 100 while the robotic machine tool 128 is machining a manufacturing blank 148 that includes titanium or magnesium. For example, when machining titanium or magnesium, the sensor 124 can sense a gradual temperature rise or the sensor signals 120 can signal the presence of fire or plasma. The machine learning module 136 can then assess the correct fire extinguishing mechanism to be employed and generate an adjusted CNC configuration. In some embodiments, the one or more sensors 116, 124 include an accelerometer. The accelerometer can be used to measure an orientation of the robotic machine tool 128 or a vibration experienced by the end effector 132. For example, the sensor signals 120 can represent a pressure or a vibration experienced by the manufacturing blank 148 that is being grasped by the end effector. The robotic machine tool 128 can include a stepper motor or other physical gearing to allow a sensor to determine a position of an axis that is being moved.

The machine learning module 136 is communicably coupled to the one or more sensors 116, 124. The machine learning module 136 includes one or more computer processors 140 and one or more machine learning models 144. The machine learning model 144 is trained based on manufacturing parameters to drive the robotic machine tool 128 while responding to the sensor signals 120. In other embodiments, the machine learning module 136 includes additional components than those described herein.

The computer processor 140 executes the one or more machine learning models 144 to generate CNC configurations for the robotic machine tool 128. The computer processor 140 can be a digital processor, a microprocessor, an application-specific integrated circuit (ASIC), a programmable logic controller (PLC), or another type of processor implemented using components depicted in more detail below with reference to FIG. 3.

Each machine learning model 144 is a mathematical and statistical model used by the computer processor 140 in order to drive the robotic machine tool 128 to perform one or more manufacturing tasks without using explicit instructions. Different machine learning models 144 can be trained on the computer processor 104 and downloaded onto the modular robotic apparatus 112 to form a manufacturing process. Each machine learning model 144 can be trained based on one or more manufacturing parameters for generation of a CNC configuration to drive the robotic machine tool 128. For example, a different machine learning model 114 can be trained to perform each of several different tasks including creation of manufacturing stock (e.g., smelting or mining), identification of manufacturing stock, handling of manufacturing stock, selection of manufacturing stock, or manipulation of manufacturing stock.

In some embodiments, the machine learning model 144 identifies a location of material in an inventory that corresponds to the manufacturing parameters for a desired manufacturing task. The CNC configuration drives the robotic machine tool 128 to find the material. The machine learning model 144 can identify a type of blank that is best suited for a manufactured part. For example, the machine learning model 144 can be trained based on a capabilities array (i.e., a database that contains a list of the available tools, and parameters, limitations, or operating characteristics of the tools). The CNC configuration enables the robotic machine tool 128 to travel to the manufacturing blank 148 needed, identify the manufacturing blank 148, and select an end effector 132. For example, the end effector 132 selected can either be articulating or have a physical profile that accepts or retains the manufacturing blank 148 to be handled.

Continuing with the example above, the robotic machine tool 128 loads the selected end effector 132 in accordance with the CNC configuration and grasps the manufacturing blank 148. If the desired end effector 132 is not in inventory or damaged, the robotic machine tool 128 requests that the correct end effector be manufactured or modifies an existing end effector to perform the intended use. The modular robotic apparatus 112 can compute an alternative manufacturing solution to manufacture the requested item, initiate a search within a database of other machine systems to determine whether the end effector 132 is in inventory or in use, or request that the end effector 132 be transported to the desired worksite. The robotic machine tool 128 can request operator intervention or halt production. The robotic machine tool 128 travels to a next location and loads the manufacturing blank 148 onto a machine (e.g., a saw). The robotic machine tool 128 holds the manufacturing blank 148 during processing. The machine learning model 144 can take into account whether the particular robotic machine tool 128 can withstand vibrations or a particular temperature, when the CNC configuration is generated. The robotic machine tool 128 initiates processing of the manufacturing blank 148. When a machine cycle is complete, the machine learning model 144 determines whether to mark or identify the manufactured part (e.g., if it will be used immediately or just move to the next operation). If the manufactured part is to be marked, the machine learning model 144 determines an appropriate marking system (e.g., laser, marking pen, dot peening, laser welding, or engraving). The robotic machine tool 128 moves the finished part to a next location.

The modular robotic apparatus 112 can determine to work independently or coordinate operations with another robot if the intended action does not achieve the desired results. For example, a 20 foot long piece of material deflects so much that it requires two (or more) robots to load it onto a saw. In another example, a material in question is too heavy for one robot and additional robot(s) are required to share the load.

In some embodiments, a machine learning model 144 is trained to perform tracking operations such as tracking manufacturing stock and remnants, tracking manufactured parts, tracking equipment, tracking historical data (e.g., what was most efficient, what did not work, or lessons learned), or trend analysis, such as a number of cuts from a sawblade before it gets dull or breaks, or a number of passes on an endmill before it degrades or breaks. In some embodiments, the machine learning model 144 recommends to an operator that a part, blade, or cutter be replaced before it is damaged or broken. Thus a part is not scrapped and avoids jamming the machine. In some embodiments, a machine learning model 144 determines to automatically replace the part, blade, or cutter (or mitigate the action that generates a fault) based upon reducing operational risk management (ORM) analysis. ORM analysis can depend on whether the machine learning model 144 is trying to favor machine tool life, cutter/blade life, a reduction in mean time between failures, or minimize maintenance intervals.

In some embodiments, a machine learning model 144 is trained to perform operations such as materials storage, material dismantling (e.g., disassembly, crushing, or grinding), or recycling (e.g., taking old material or remnants and creating new material or new manufacturing stock). In some embodiments, a machine learning model 144 is trained to perform damage reduction operations (e.g., tasks to perform in the event of a fire, a flood, an earthquake, or breakage), fire suppression (e.g., select a fire extinguisher to use on particular material), restarting the manufacturing process after a damage event, or preservation (e.g., rust resistant coatings or purging atmosphere).

Several different machine learning models 144 can be trained and stitched together on the machine learning module 136 such that each machine learning model 144 drives the robotic machine tool 128 to perform a different manufacturing task in sequence. The sequence can include machining operations such as processing (i.e., conversion of manufacturing stock into manufacturing blanks 148 and remnants), cutting, sawing, turning, water jetting, laser cutting, laser engraving, braking, shearing, punching, or 3D printing. The sequence can further include post-machining operations such as inspection and quality assurance (e.g., laser scanning, touch probing, weighing, RADAR, or LiDAR), cleaning, rinsing, or marking (i.e., placing information onto the manufacturing blank 148). The marking can be either machine readable or not machine readable. The marking can be either direct contact marking or non-contact marking, such as laser marking, dot pen marking, scribing, pneumatic pen marking, or printing. The information marked can include the date manufactured, source of material, type of material, length, or width. The sensor 116 can be used to read the marks on the manufacturing blank 148. The sequence can further include operations such as surface preparation (e.g., sand blasting or grinding), priming, painting, anodizing, or powder coating).

Any of the above manufacturing tasks or operations can be selected and stitched together into a manufacturing process by selecting the corresponding machine learning models and downloading them onto the machine learning module 136 for execution.

The one or more manufacturing parameters define a manufacturing task to be performed by the modular robotic apparatus 112. The manufacturing parameters include testing parameters, quality assurance parameters, geometric dimensioning or tolerance parameters, or parameters related to solid model generation, solid model storage, or solid model version control. The manufacturing parameters specify the characteristics required for a manufacturing task. For example, geometric dimensioning and tolerance parameters can include dimensions of a manufactured part, weight, or density. The manufacturing parameters can be used to train the machine learning model 144 to perform computer modeling of three-dimensional solids for 3D-computer-aided design.

The one or more manufacturing parameters can further define efficiency, profitability, longevity, or manufacturing time. In some embodiments, the manufacturing parameters are used by the machine learning module 136 to track available resources, such as equipment, power, manufacturing stock, manufacturing time, and profitability metrics based on the sensor signals 120. For example, the end effector 132 can use two different sawing tools to cut aluminum. A sawing tool A costs $100 per hour due to maintenance and saw blades, but can cut 100 manufacturing blanks per hour. A sawing tool B costs $10 per hour due to maintenance and saw blades, but can cut 10 manufacturing blanks per hour. To reduce the manufacturing time or if there are a larger number of manufacturing blanks 148 to be sawn, the CNC configuration indicates that the sawing tool A is the better choice. On the other hand, if the manufacturing task requires only one cut and the profitability metrics indicate the process can afford to wait 6 minutes, the CNC configuration indicates that the sawing tool B is the better choice.

In another example, the end effector 132 can use two different sawing tools to cut aluminum. The sawing tool A can cut 100 manufacturing blanks 148 per hour but requires servicing every 10 hours. The sawing tool B can cut 10 manufacturing blanks per hour but requires servicing every 100 hours. To reduce the manufacturing time or if there are a larger number of manufacturing blanks 148 to be sawn, the CNC configuration indicates that the sawing tool A is the better choice. On the other hand, if the manufacturing task requires only one cut and the profitability metrics indicate the process can afford to wait 6 minutes, the CNC configuration indicates that the sawing tool B is the better choice.

The machine learning module 136 adjusts, by the machine learning model 144, the CNC configuration based on the sensor signals 120. For example, the sensor signals 120 can indicate warning conditions that are either programmed or determined from the manufacturing environment 100. The warning conditions are related to the manufacturing environment 100 and the type and quantity of equipment or personnel that are co-located or at risk traveling through the manufacturing environment 100. For example, if the robotic machine tool 128 is performing titanium welding on a large structure, it can be more cost effective to create a large vacuum chamber and fill it up with argon (or another noble gas). On the other hand, if the robotic machine tool 128 is cutting magnesium, underwater sawing helps to reduce the heat build-up on the manufacturing blank 148 and the blade. The underwater sawing also helps to remove chips from the attack zone where the saw or blade is interacting with the manufacturing blank 148. The machine learning module 136 can thus adjust the CNC configuration based on the task and environment.

In some embodiments, the machine learning module 136 uses quality assurance parameters and the sensor signals 120 to improve the manufacturing process. The quality assurance parameters define acceptable dimensions of the manufactured part or define a range of acceptable options. For example, the manufactured part can be a 4" cube of aluminum to hold open a door. The sensor signals 120 can reflect that no aluminum is at hand, but the manufacturing environment 100 has enough mild steel or titanium for the task. The machine learning module 136 can determine that the material used, as long as the density is such that the final part weighs more than a particular number of pounds, is unimportant.

In some embodiments, the machine learning module 136 uses geometric dimensioning and tolerance parameters to improve the manufacturing process. The range of acceptable geometrical dimensioning and tolerance parameters can include price, weight, or an override capability. The machine learning module 136 can determine the environmental conditions under which a specification can be violated. For example, the manufacturing environment 100 can contain a brick that is 0.0015" out of tolerance. Certain manufacturing conditions can shorten the life of the robotic machine tool 128 or other machine equipment, however, such conditions can be overridden because of escalated environmental conditions. For example, the existing manufacturing stock is not ideal but there are other pieces of manufacturing stock that can work. In other example, there can be no existing stock, but the machine learning module 136 adjusts the CNC configuration to enable cannibalizing of existing equipment, tools, or furnishings to achieve the mission. For example, in a battle override scenario, the machine learning module 136 enables an operator to determine if the robotic machine tool 128's operating parameters can be overridden (potentially shortening the life of the tooling or equipment) in order to move faster or use a tool or equipment in a way that it was not intended for. In another example, the adjusted CNC configuration can reflect a self-destruct capability, i.e., the robotic machine tool 128 can be requested to self-destruct in order to be rendered unusable.

The robotic machine tool 128 can be used to shape or machine a manufacturing blank 148 made of metal or other rigid materials, usually by cutting, boring, grinding, shearing, or other forms of deformation. The robotic machine tool 128 is communicably coupled to the machine learning module 136. The robotic machine tool 128 includes means of constraining the manufacturing blank 148. The machine learning module 136 provides a guided movement of the parts of the robotic machine tool 128. Thus, relative movement between the manufacturing blank 148 and the robotic machine tool 128 is controlled or constrained by the machine learning module 136. The robotic machine tool 128 includes an end effector 132. In other embodiments, the robotic machine tool 128 includes additional components than those described herein.

The end effector 132 is a portion of the robotic machine tool 128 that performs a manufacturing action. In some embodiments, other tools such as for drilling or cutting can be attached to the end effector 132. For example, the end effector 132 can include jaws or claws that physically grasp the manufacturing blank 148, or pins or hackles that physically penetrate a surface of an object. The robotic machine tool 128 is configured to operate the end effector 132 in accordance with the adjusted CNC configuration to perform a manufacturing task.

In some embodiments, the adjusting of the CNC configuration includes determining, based on the sensor signals 120, that a manufacturing blank 148 being machined by the end effector 132 is a reject. A manufacturing blank 148 can be treated as a reject if it fails to match the dimensions, weight, density or other manufacturing parameters. If the sensor signals 120 indicate presence of a reject, the machine learning module 136 adjusts the CNC configuration. The robotic machine tool 128 operates the end effector 132 in accordance with the adjusted CNC configuration. For example, the end effector 132 includes a laser or a water jet. The operating of the end effector 132 in accordance with the adjusted CNC configuration includes adjusting the cutting by the laser or the water jet. The adjustments are made to obtain a particular cut length defined by the manufacturing parameters. The machine learning module 136 can also inform a previous machine on the manufacturing line that a laser or waterjet needs to be adjusted in order to obtain a desired cut length, width, or surface finish, or that a cutting tool needs to be replaced or sharpened.

In some embodiments, when a reject is found, the robotic machine tool 128 halts the machining of the manufacturing blank 148 by the end effector 132, flashes a red light, stops a production line, or transmits a message to an operator. In some embodiments, the robotic machine tool 128 identifies the critical dimension or parameter that was created (for example, too much material was removed), and saves the new critical dimension into a database. A determination is made on whether to place the rejected part into a stock or inventory pool with the new critical features, or recycle the part. In some embodiments, the robotic machine tool 128 initiates a recycling program for the defective or rejected manufacturing blank 148. The recycling program can include planning a trajectory for the robotic machine tool 128 to a recycling bin, placing the reject at a particular orientation in a pile, or melting or flattening the reject by the end effector 132. The rejected part can also be repaired by 3D printing, automated welding, or laser fusion, which can be machined down to spec to build up material around the defective area to regain the desired dimensions. The additive and subtractive process can be repeated several times in order to get the desired part features.

In some embodiments, the operating of the end effector 132 in accordance with the adjusted CNC configuration includes reducing a cutting speed of the end effector 132. For example, if a sensor 124 senses a temperature rise when machining magnesium, the adjusted CNC configuration decreases a pressure on the end effector 132. The decreased pressure leads to lower stress on the blank 148 and can reduce the temperature. In another example, the adjusted CNC configuration increases an amount of air cooling by the modular robotic apparatus 112. The air cooling can be used locally by increasing convective airflow (passive cooling) or forced circulation. In some embodiments, the adjusted CNC configuration increases a flow of water coolant by the modular robotic apparatus 112. For example, a flow of cutting fluid (a type of coolant and lubricant designed for metalworking processes) can be increased. In some embodiments, the operating of the end effector 132 in accordance with the adjusted CNC configuration includes creating a vacuum around the end effector 132 by the modular robotic apparatus 128. For example, a vacuum can make the material being cut harder to ignite and/or lower temperature in the space around the end effector 132.

In some embodiments, when the machine learning module 136 senses an occurrence of fire or plasma in the manufacturing environment 100 based on the sensor signals 120, the CNC configuration is adjusted to reduce an impact to subsequent machining, reduce perturbation of other machines, or maintain a safe environment for the rest of the manufacturing environment 100. For example, the machine learning module 136 determines, based on the sensor signals 120, whether the end effector 132 should be sacrificed to safe the modular robotic apparatus 112 or to transmit a request for external assistance, such as firefighter personnel, water suppression, or sand suppression. In another example, the adjusted CNC configuration instructs the robotic machine tool 128 to halt cutting and perform fire control.

In some embodiments, the adjusting of the CNC configuration includes adjusting a location at which a manufacturing blank 148 is grasped by the end effector 132, adjusting an orientation at which the manufacturing blank 148 is grasped, or adjusting a speed of movement of the end effector 132. For example, the original CNC configuration generated based on the manufacturing parameters enable the robotic machine tool 128 to obtain information from the sensor 124 related to material positioning, orientation of a manufacturing stock or blank 148, an amount of deflection of a blank 148. The CNC configuration can enable the robotic machine tool 128 to determine a location on the manufacturing blank 148 grasped by the end effector 132, or whether manufacturing blank 148 is twisted, angled, or crushed.

For example, consider a manufacturing task in which the end effector 132 is required to lift a 4'×8' sheet of material to be placed onto a CNC laser cutter. If the material is more rigid or heavy, such as a 0.5" thick titanium sheet, the 4'×8' sheet will droop down approximately 0.2" from one side of the material to another side over the 8' length. If the material is light, such as 1/16" thick aluminum, the 4'×8' sheet will droop down approximately 2'. If the droop is not accounted for or the material deflection and positioning is not monitored, the material can collide with another object in the manufacturing environment 100. The machine learning module 136 determines that an extreme edge of the sheet should be placed closest to the corner of the CNC laser cutter. The adjusted CNC configuration thus enables expedited processing of the material without damaging the material or the equipment. The adjusted CNC configuration can also indicate a need for additional robot(s) to assist (if available), for operator assistance, initiate a system abort, or determine that the damage is acceptable.

In another example, an equipment has a 6" diameter opening through which manufacturing stock is to be fed. If the manufacturing blank 148 to be fed is 20' long, the adjusted CNC configuration accounts for deflection, travel of the robotic machine tool 128, ramp up and ramp down speed curves that affect the manufacturing blank 148, as well as a location on the manufacturing blank 148 at which the manufacturing blank 148 is grasped or secured. If the manufacturing blank 148 is a 20' section of 2" aluminum tubing, the deflection can be 3" over 20'. The adjusted CNC configuration prevents the robotic machine tool 128 from starting or stopping too suddenly to prevent wobble of the manufacturing blank 148. Wobble of the manufacturing blank 148 (e.g., over a 12" spread) can make it difficult to insert the manufacturing blank 148 into the opening. The machine learning module 136 intelligently ramps up and ramps down the approach speed and deceleration speed of the robotic machine tool 128 to minimize deflection and bouncing of the manufacturing blank 148. The adjusted CNC configuration shifts an attach point of the end effector 132 (e.g., grasp the manufacturing blank 148 by a center of gravity instead of an end of the manufacturing blank 148). In other embodiments, the adjusted CNC configuration uses constructive or destructive resonance to achieve a desired result. In other embodiments, the adjusted CNC configuration would request assistance from other robot(s) or operator assistance.

In another embodiments, the CNC configuration enables selection of different end effectors based upon intended use, e.g., based on whether a manufacturing blank 148 is being grasped or pushed. The CNC configuration can enable selection of different end effectors based upon whether a manufacturing blank 148 is softer, harder, fragile, or whether the manufacturing blank 148 can deform. If an end effector 132 is used to grasp a manufacturing blank 148 while the manufacturing blank 148 is being machined, a combination of an end effector 132 and robotic machine tool 128 that is more rigid and does not vibrate during machining is selected. A robotic machine tool 128 that has a sensor (e.g., accelerometer) to transmit pressure and vibration feedback can be selected. If the machine learning module 136 detects slippage, the adjusted CNC configuration enables the robotic machine tool 128 to slow the cutter speed or apply less pressure.

Example Machine Learning Process

Figure 2:
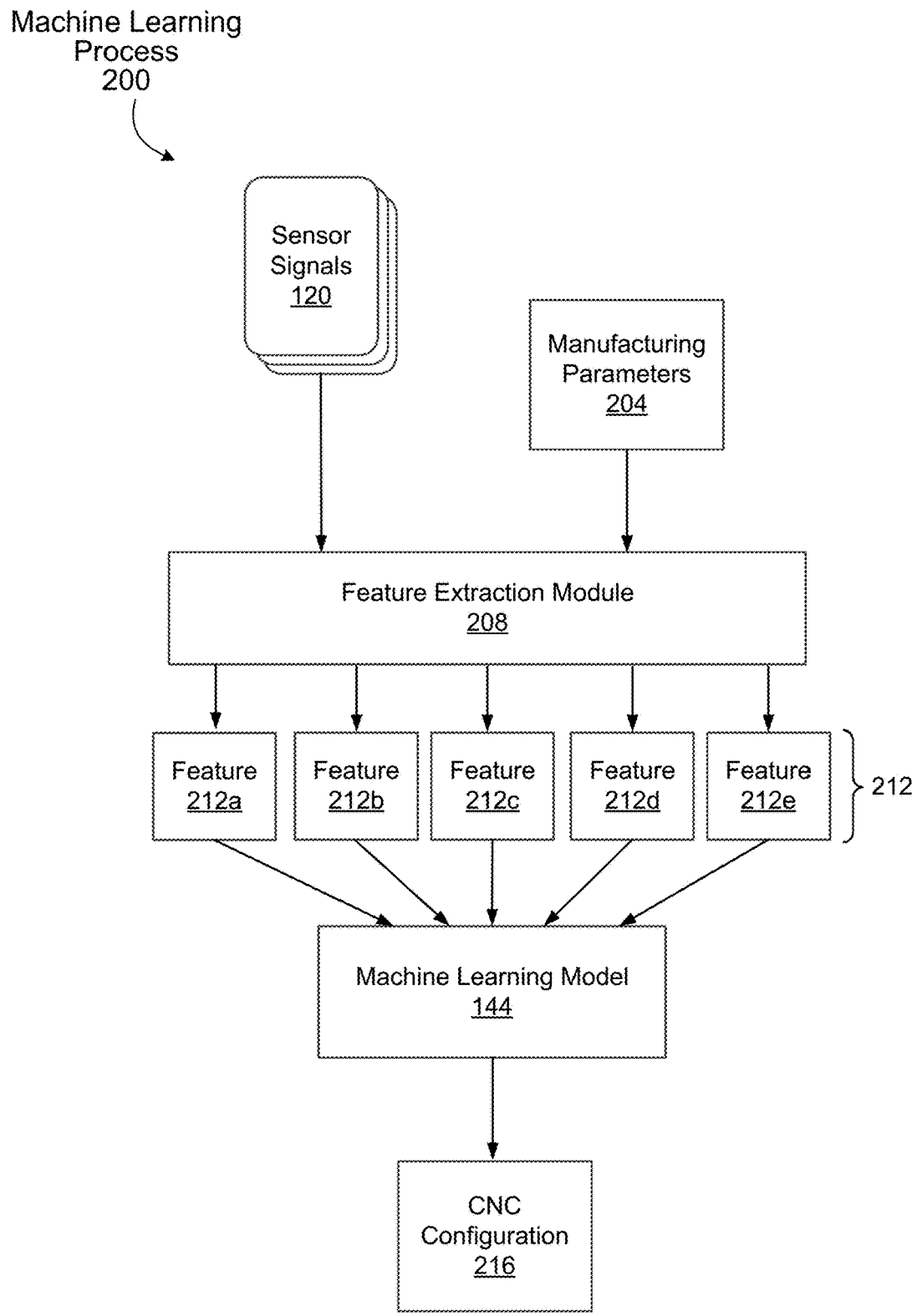
FIG. 2 illustrates an example machine learning process for computer numerical control of a robotic machine tool, in accordance with one or more embodiments.

FIG. 2 illustrates an example machine learning process 200 for computer numerical control of a robotic machine tool 128, in accordance with one or more embodiments. In other embodiments, the machine learning process 200 includes additional or fewer steps than those described herein. Similarly, the functions can be distributed among the components and/or different entities in a different manner than is described here. The one or more sensors 116, 124 generate sensor signals 120 representing the manufacturing environment 100 in which the modular robotic apparatus 112 is located. The sensor signals 120 are illustrated and described in more detail above with reference to FIG. 1.

In some embodiments, the machine learning module 136 includes a feature extraction module 208. The feature extraction module 208 extracts a feature vector 212 from the sensor signals 120 and the manufacturing parameters 204. The manufacturing parameters 204 are described in more detail above with reference to FIG. 1. A feature 212a can represent a dimension, weight, density, or hardness of a manufacturing blank 148. A feature 212b can represent a characteristic state of matter (e.g., gaseous, solid, liquid, plasma), such as pressure, vacuum, or a percentage of oxygen in the air. A feature 212c can represent a quality assurance parameter, such as geometric dimensioning or tolerance. A feature 212d can represent information from a capabilities array, such as a limitation or operating characteristics of a tool. A feature 212e can represent whether a manufacturing blank 148 is twisted, angled, or crushed, or has a chip or burr in the material which does not allow it to be seated well. In some embodiments, the feature extraction module 208 uses linear discriminant analysis (LDA), principle component analysis (PCA), or the like to reduce the amount of data in the feature vector 212 to a smaller, more representative set of data.

The machine learning model 144 is trained, based on the one or more manufacturing parameters 204, for generation of a CNC configuration 216. The manufacturing parameters 204 define a manufacturing task to be performed by the modular robotic apparatus 112 as described in more detail above with reference to FIG. 1. The machine learning module 136 adjusts the CNC configuration 216 based on the sensor signals 120. Machine learning techniques are used to train the machine learning model 144, that when applied to the feature vector 212, outputs indications of whether the feature vector 212 has an associated property or properties. As part of the training of the machine learning model 144, a training set of features 212 is formed by identifying a positive training set of features that have been determined to have the property in question, and, in some embodiments, forms a negative training set of features that lack the property in question.

In some embodiments, supervised machine learning is used to train the machine learning model 144 with the feature vector 212 of the positive training set and the negative training set serving as the inputs. In some embodiments, different machine learning techniques, such as deep learning, artificial intelligence, neural networks, linear support vector machine (linear SVM), boosting for other algorithms (e.g., AdaBoost), logistic regression, naïve Bayes, memory-based learning, random forests, bagged trees, decision trees, boosted trees, or boosted stumps, are used.

Example Computer System

Figure 3:
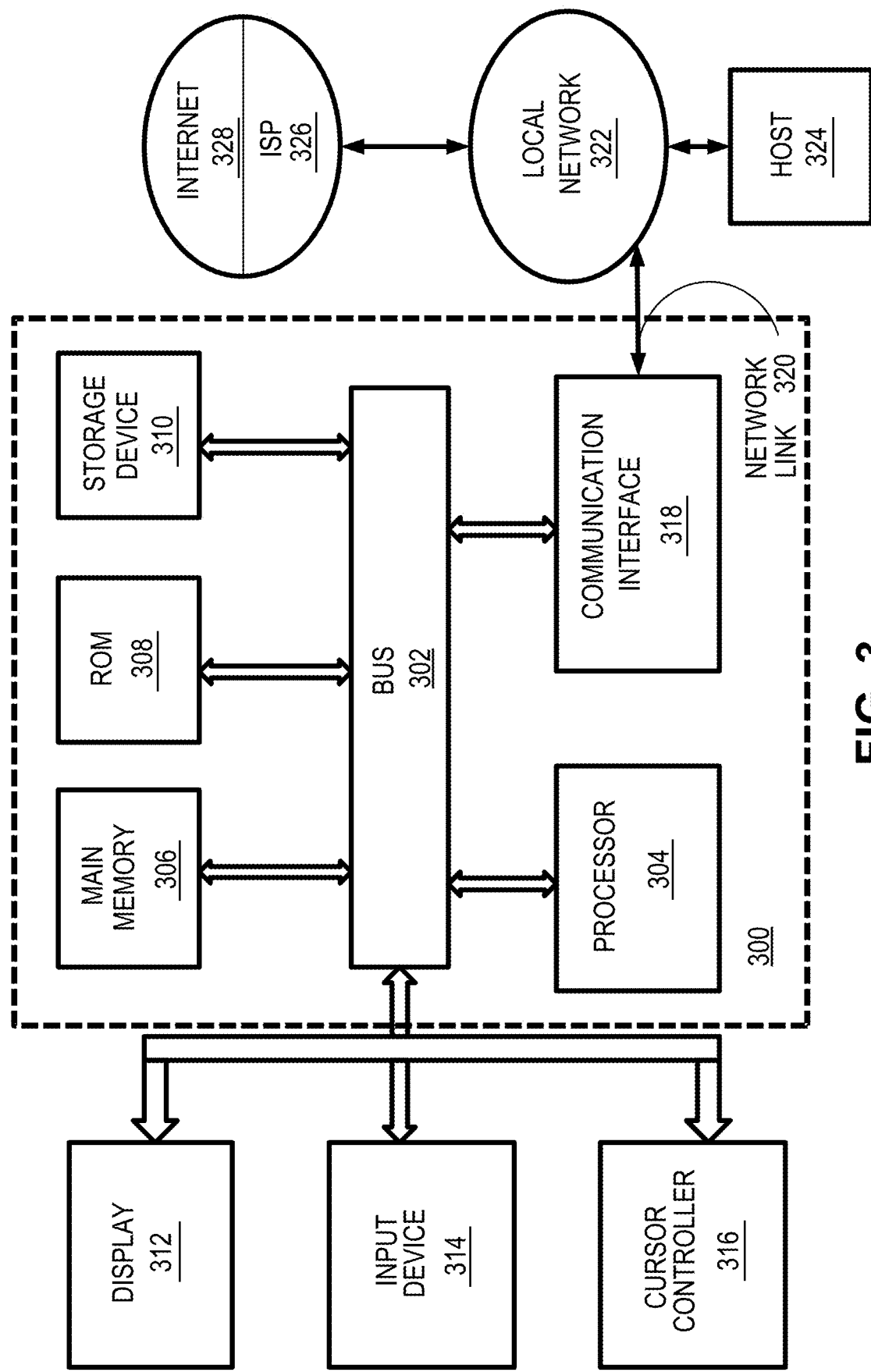
FIG. 3 illustrates an example computer system for machine learning driven computer numerical control of a robotic machine tool, in accordance with one or more embodiments.

FIG. 3 illustrates an example computer system 300 for machine learning driven computer numerical control of the robotic machine tool 128, in accordance with one or more embodiments. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. The non-transitory media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, acoustic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud or a part of the cloud described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other nonvolatile storage for later execution.

Process for Machine Learning Driven Computer Numerical Control of a Robotic Machine Tool FIG. 4 illustrates an example process 400 for machine learning driven computer numerical control of a robotic machine tool 128, in accordance with one or more embodiments In one embodiment, the process of FIG. 4 is performed by the modular robotic apparatus 112. Other entities, for example, one or more components of the computer server 104 perform some or all of the steps of the process 400 in other embodiments. Likewise, embodiments may include different and/or additional steps, or perform the steps in different orders.

The modular robotic apparatus 112 generates 404, by one or more sensors 116, 124, sensor signals 120. The sensor signals 120 represent a manufacturing environment 100 in which the modular robotic apparatus 112 is located. The modular robotic apparatus 112 includes the robotic machine tool 128 and a machine learning module 136. The machine learning module 136 includes a machine learning model 144. In some embodiments, the modular robotic apparatus 112 receives a trigger signal or alert from a sensor or other equipment that triggers an event. For example, a coordinate measuring machine or gauge can measure physical features of a finished part and transmit an information packet to the modular robotic apparatus 112. The information packet can contain dimensions, a weight, a density, a hardness, an amount of tool wear, marks, or a surface finish. The information packet informs the modular robotic apparatus 112 that a tool, laser, or waterjet needs to be adjusted in order to obtain a desired cut length, width, or surface finish, or that a cutting tool needs to be replaced or sharpened.

The modular robotic apparatus 112 generates 408, by the machine learning model 144, a CNC configuration. The machine learning model 144 is trained based on one or more manufacturing parameters 204 defining a manufacturing task to be performed by the modular robotic apparatus 112. The CNC configuration is a coded program set of instructions that controls the robotic machine tool 128 movement. For example, the CNC configuration automates drills, boring tools, lathes, or 3D printers to alter the manufacturing blank 148 to meet specifications defined by manufacturing parameters.

The modular robotic apparatus 112 adjusts 412, by the machine learning model 144, the CNC configuration based on the sensor signals 120. For example, the sensor signals 120 can indicate warning conditions that are either programmed or determined from the manufacturing environment 100. If the robotic machine tool 128 is performing titanium welding on a large structure, it can be more cost effective to create a large vacuum chamber and fill it up with argon (or another noble gas). The machine learning module 136 can thus adjust the CNC configuration based on the task and environment.

The modular robotic apparatus 112 operates 416, by the robotic machine tool 128, an end effector 132 of the robotic machine tool 128 in accordance with the adjusted CNC configuration to perform the manufacturing task. In some embodiments, the adjusting of the CNC configuration includes determining, based on the sensor signals 120, that a manufacturing blank 148 being machined by the end effector 132 is a reject. For example, the end effector 132 includes a laser or a water jet. The operating of the end effector 132 in accordance with the adjusted CNC configuration includes adjusting the cutting by the laser or the water jet. The adjustments are made to obtain a particular cut length defined by the manufacturing parameters.

In the foregoing description, embodiments of the embodiments have been described with reference to numerous specific details that may vary from implementation to implementation. The description and drawings are, accordingly, to be regarded in an illustrative rather than a restrictive sense. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A modular robotic apparatus comprising:
   one or more sensors configured to generate sensor signals representing a manufacturing environment in which the modular robotic apparatus is located;
   a machine learning module communicably coupled to the one or more sensors and comprising one or more computer processors configured to perform operations comprising:
   generating, by a machine learning model trained based on one or more manufacturing parameters, a computer numerical control (CNC) configuration, the one or more manufacturing parameters defining a manufacturing task to be performed by the modular robotic apparatus; and
   adjusting, by the machine learning model, the CNC configuration based on the sensor signals; and
   a robotic machine tool communicably coupled to the machine learning module and comprising an end effector, the robotic machine tool configured to operate the end effector in accordance with the adjusted CNC configuration to perform the manufacturing task,
   wherein, if the machine learning model determines that one or more additional modular robotic apparatuses are required to perform the manufacturing task, the machine learning module adjusts the CNC configuration to cause the modular robotic apparatus to coordinate operations with the one or more additional robotic modular apparatuses, wherein determining whether one or more additional modular robotic apparatuses are required to perform the manufacturing task comprises (i) measuring a parameter of a workpiece being manipulated as part of the manufacturing task, (ii) determining whether the measured parameter of the workpiece exceeds a predetermined threshold value, and (iii) based on determining that the measured parameter of the workpiece exceeds the predetermined threshold value, determining that one or more additional modular robotic apparatuses are required to perform the manufacturing task.

2. The modular robotic apparatus of claim 1, wherein the one or more sensors comprise a coordinate measuring machine (CMM), and wherein the sensor signals represent at least one of a dimension, a weight, a density, a hardness, an amount of tool wear, or a surface finish of a manufacturing blank on which the CNC configuration defines the manufacturing task to be performed.

3. The modular robotic apparatus of claim 1, wherein the end effector comprises at least one of a laser, a water jet, a plasma cutter, an oxy-acetylene cutter, or a sandblaster and wherein the operating of the end effector in accordance with the adjusted CNC configuration comprises cutting, using the end effector, a manufacturing blank to obtain a particular cut length defined by the manufacturing parameters.

4. The modular robotic apparatus of claim 1, wherein the adjusting of the CNC configuration comprises determining, based on the sensor signals, that a manufacturing blank being machined by the end effector is a reject, and wherein the operating of the end effector in accordance with the adjusted CNC configuration comprises:

halting the machining of the manufacturing blank by the end effector; and initiating a recycling program for the manufacturing blank.

5. The modular robotic apparatus of claim 1, wherein the sensor signals represent an increase in a temperature of the manufacturing environment while the robotic machine tool is machining a manufacturing blank comprising at least one of titanium or magnesium.

6. The modular robotic apparatus of claim 1, wherein the operating of the end effector in accordance with the adjusted CNC configuration comprises at least one of:

reducing a cutting speed of the end effector;

decreasing a pressure on the end effector;

increasing an amount of air cooling by the modular robotic apparatus;

increasing a flow of water coolant by the modular robotic apparatus; or creating a vacuum around the end effector by the modular robotic apparatus.

7. The modular robotic apparatus of claim 1, wherein the one or more sensors comprise an accelerometer, wherein the sensor signals represent at least one of a pressure or a vibration experienced by a manufacturing blank being grasped by the end effector, and wherein the adjusting of the CNC configuration comprises at least one of:

adjusting a location at which the manufacturing blank is grasped by the end effector;

adjusting an orientation at which the manufacturing blank is grasped; or adjusting a speed of movement of the end effector.

8. The modular robotic apparatus of claim 1, wherein, in performing the manufacturing task, the modular robotic apparatus autonomously identifies an end effector suitable for performing the manufacturing task.

9. The modular robotic apparatus of claim 8, wherein, if the desired end effector is not available, the modular robotic apparatus autonomously computes a modified CNC configuration to perform the manufacturing task.

10. The modular robotic apparatus of claim 8, wherein, while performing the manufacturing task, the modular robotic apparatus is configured to autonomously decide to sacrifice the end effector to save the modular robotic device from damage.

11. The modular robotic apparatus of claim 1 wherein measuring the parameter of the workpiece being manipulated as part of the manufacturing task comprises at least one of (i) determining that a workpiece being manipulated as part of the manufacturing task is too heavy for a single robotic apparatus to support, (ii) determining that a workpiece being manipulated as part of the manufacturing task would be deformed if supported by a single robotic apparatus, or (iii) determining that a workpiece being manipulated as part of the manufacturing task would not be held rigidly enough if supported by a single robotic apparatus for the manufacturing task to which the workpiece would be subjected.

12. One or more non-transitory storage media storing instructions which, when executed by one or more computing devices, cause the one or more computing devices to:

generate, by one or more sensors, sensor signals representing a manufacturing environment in which a modular robotic apparatus is located, the modular robotic apparatus comprising a robotic machine tool and a machine learning module, the machine learning module comprising a machine learning model;

generate, by the machine learning model, a computer numerical control (CNC) configuration, the machine learning model trained based on one or more manufacturing parameters defining a manufacturing task to be performed by the modular robotic apparatus;

adjust, by the machine learning model, the CNC configuration based on the sensor signals; and operate, by the robotic machine tool, an end effector of the robotic machine tool in accordance with the adjusted CNC configuration to perform the manufacturing task, wherein, if the machine learning model determines that one or more additional modular robotic apparatuses are required to perform the manufacturing task, the machine learning module adjusts the CNC configuration to cause the modular robotic apparatus to coordinate operations with the one or more additional robotic modular apparatuses, wherein determining whether one or more additional modular robotic apparatuses are required to perform the manufacturing task comprises (i) measuring a parameter of a workpiece being manipulated as part of the manufacturing task, (ii) determining whether the measured parameter of the workpiece exceeds a predetermined threshold value, and (iii) based on determining that the measured parameter of the workpiece exceeds the predetermined threshold value, determining that one or more additional modular robotic apparatuses are required to perform the manufacturing task.

13. The one or more non-transitory storage media of claim 12, wherein the one or more sensors comprise a coordinate measuring machine (CMM), and wherein the sensor signals represent at least one of a dimension, a weight, a density, a hardness, an amount of tool wear, or a surface finish of a manufacturing blank on which the CNC configuration defines the manufacturing task to be performed.

14. The one or more non-transitory storage media of claim 12, wherein the end effector comprises at least one of a laser or a water jet, and wherein the operating of the end effector in accordance with the adjusted CNC configuration comprises cutting, using the at least one of the laser or the water jet, a manufacturing blank to obtain a particular cut length defined by the manufacturing parameters.

15. The one or more non-transitory storage media of claim 12, wherein the adjusting of the CNC configuration comprises determining, based on the sensor signals, that a manufacturing blank being machined by the end effector is a reject, and wherein the operating of the end effector in accordance with the adjusted CNC configuration comprises:
   halting machining of the manufacturing blank by the end effector; and
   initiating a recycling program for the manufacturing blank.

16. The one or more non-transitory storage media of claim 12, wherein the sensor signals represent an increase in a temperature of the manufacturing environment while the robotic machine tool is machining a manufacturing blank comprising at least one of titanium or magnesium.

17. The one or more non-transitory storage media of claim 12, wherein the operating of the end effector in accordance with the adjusted CNC configuration comprises at least one of:
   reducing a cutting speed of the end effector;
   decreasing a pressure on the end effector;
   increasing an amount of air cooling by the modular robotic apparatus;
   increasing a flow of water coolant by the modular robotic apparatus; or
   creating a vacuum around the end effector by the modular robotic apparatus.

18. The one or more non-transitory storage media of claim 12, wherein the one or more sensors comprise an accelerometer, wherein the sensor signals represent at least one of a pressure or a vibration experienced by a manufacturing blank being grasped by the end effector, and wherein the adjusting of the CNC configuration comprises at least one of:
   adjusting a location on the manufacturing blank at which the manufacturing blank is grasped by the end effector;
   adjusting an orientation at which the manufacturing blank is grasped; or
   adjusting a speed of movement of the end effector.

19. The non-transitory storage media of claim 12, wherein, in performing the manufacturing task, the modular robotic apparatus autonomously identifies an end effector suitable for performing the manufacturing task.

20. The non-transitory storage media of claim 12, wherein, if the desired end effector is not available, the modular robotic apparatus autonomously computes a modified CNC configuration to perform the manufacturing task.

21. The non-transitory storage media of claim 12, wherein, while performing the manufacturing task, the modular robotic apparatus is configured to autonomously decide to sacrifice the end effector to save the modular robotic device from damage.

22. The one or more non-transitory storage media of claim 12 wherein measuring the parameter of the workpiece being manipulated as part of the manufacturing task comprises at least one of (i) determining that a workpiece being manipulated as part of the manufacturing task is too heavy for a single robotic apparatus to support, (ii) determining that a workpiece being manipulated as part of the manufacturing task would be deformed if supported by a single robotic apparatus, or (iii) determining that a workpiece being manipulated as part of the manufacturing task would not be held rigidly enough if supported by a single robotic apparatus for the manufacturing task to which the workpiece would be subjected.

23. A method comprising:
   generating, by one or more sensors, sensor signals representing a manufacturing environment in which a modular robotic apparatus is located, the modular robotic apparatus comprising a robotic machine tool and a machine learning module, the machine learning module comprising a machine learning model;
   generating, by the machine learning model, a computer numerical control (CNC) configuration, the machine learning model trained based on one or more manufacturing parameters defining a manufacturing task to be performed by the modular robotic apparatus;
   adjusting, by the machine learning model, the CNC configuration based on the sensor signals; and
   operating, by the robotic machine tool, an end effector of the robotic machine tool in accordance with the adjusted CNC configuration to perform the manufacturing task,
   wherein, if the machine learning model determines that one or more additional modular robotic apparatuses are required to perform the manufacturing task, the machine learning module adjusts the CNC configuration to cause the modular robotic apparatus to coordinate operations with the one or more additional robotic modular apparatuses,
   wherein determining whether one or more additional modular robotic apparatuses are required to perform the manufacturing task comprises (i) measuring a parameter of a workpiece being manipulated as part of the manufacturing task, (ii) determining whether the measured parameter of the workpiece exceeds a predetermined threshold value, and (iii) based on determining that the measured parameter of the workpiece exceeds the predetermined threshold value, determining that one or more additional modular robotic apparatuses are required to perform the manufacturing task.

24. The method of 15, wherein the one or more sensors comprise a coordinate measuring machine (CMM), and wherein the sensor signals represent at least one of a dimension, a weight, a density, a hardness, an amount of tool wear, or a surface finish of a manufacturing blank on which the CNC configuration defines the manufacturing task to be performed.

25. The method of claim 23, wherein the end effector comprises at least one of a laser cutter, a water jet, a plasma cutter, or an oxy-acetelene cutter, and wherein the operating of the end effector in accordance with the adjusted CNC configuration comprises cutting, using the end effector, a manufacturing blank to obtain a particular cut length defined by the manufacturing parameters.

26. The method of claim 23, wherein the adjusting of the CNC configuration comprises determining, based on the sensor signals, that a manufacturing blank being machined by the end effector is a reject, and wherein the operating of the end effector in accordance with the adjusted CNC configuration comprises:
   halting machining of the manufacturing blank by the end effector; and initiating a recycling program for the manufacturing blank.

27. The method of claim 23, wherein the sensor signals represent an increase in a temperature of the manufacturing environment while the robotic machine tool is machining a manufacturing blank comprising at least one of titanium or magnesium.

28. The method of claim 23, wherein the operating of the end effector in accordance with the adjusted CNC configuration comprises at least one of:
   reducing a cutting speed of the end effector;
   decreasing a pressure on the end effector;
   increasing an amount of air cooling by the modular robotic apparatus;
   increasing a flow of water coolant by the modular robotic apparatus; or
   creating a vacuum around the end effector by the modular robotic apparatus.

29. The method of claim 23, wherein, in performing the manufacturing task, the modular robotic apparatus autonomously identifies an end effector suitable for performing the manufacturing task.

30. The method of claim 23, wherein, if the desired end effector is not available, the modular robotic apparatus autonomously computes a modified CNC configuration to perform the manufacturing task.

31. The method of claim 23, wherein, while performing the manufacturing task, the modular robotic apparatus is configured to autonomously decide to sacrifice the end effector to save the modular robotic device from damage.

32. The method of claim 23 wherein measuring the parameter of the workpiece being manipulated as part of the manufacturing task comprises at least one of (i) determining that a workpiece being manipulated as part of the manufacturing task is too heavy for a single robotic apparatus to support, (ii) determining that a workpiece being manipulated as part of the manufacturing task would be deformed if supported by a single robotic apparatus, or (iii) determining that a workpiece being manipulated as part of the manufacturing task would not be held rigidly enough if supported by a single robotic apparatus for the manufacturing task to which the workpiece would be subjected.

\* \* \* \* \*